(12) United States Patent
Bao et al.

(10) Patent No.: US 10,671,686 B2
(45) Date of Patent: Jun. 2, 2020

(54) PROCESSING WEBPAGE DATA

(71) Applicant: International Business Machines Corporation, Armonk, NY (US)

(72) Inventors: Sheng Hua Bao, Beijing (CN); Dong Xu Duan, Beijing (CN); Wei Hong Qian, Beijing (CN); Chang Hua Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

(21) Appl. No.: 14/187,475

(22) Filed: Feb. 24, 2014

(65) Prior Publication Data
US 2014/0244646 A1  Aug. 28, 2014

(30) Foreign Application Priority Data
Feb. 28, 2013 (CN) .......................... 2013 1 0064517

(51) Int. Cl.
*G06F 16/954* (2019.01)

(52) U.S. Cl.
CPC .................................. *G06F 16/954* (2019.01)

(58) Field of Classification Search
CPC ........... G06F 17/30722; G06F 11/0709; G06F 17/30905; G06F 17/30761; G06F 17/30749; G06F 3/0482; G06F 16/9535; G06F 16/285; G06F 16/954; G06Q 10/10
See application file for complete search history.

(56) References Cited

U.S. PATENT DOCUMENTS

| 6,370,551 | B1 | 4/2002 | Golovchinsky et al. |
| 7,689,647 | B2 | 3/2010 | Joy et al. |
| 8,180,778 | B1 * | 5/2012 | Pedersen ............. G06F 17/3089 707/739 |
| 10,353,938 | B1 * | 7/2019 | Malpani ............. G06F 16/9535 |

(Continued)

FOREIGN PATENT DOCUMENTS

| CN | 101341464 A | 1/2009 |
| CN | 102622365 A | 8/2012 |

OTHER PUBLICATIONS

Duhan et. al, Optimization of Search Results with Duplicate Page Elimination Using Usage Data, ACEEE Int. J. on Network Security, vol. 02, No. 02, Apr. 2011.

(Continued)

*Primary Examiner* — Mariela Reyes
*Assistant Examiner* — Courtney Harmon
(74) *Attorney, Agent, or Firm* — Cantor Colburn LLP; Joseph Petrokaitis

(57) ABSTRACT

A method, apparatus and system for processing webpage data. The method includes: in response to a webpage being opened, sending a link contained in the webpage to a network side device; receiving a group identification from the network side device, the group identification being determined by the network side device according to the link and used to specify a group the link belongs to; determining whether there is a browsed link belonging to the group specified by the group identification; and in response to determining there is a browsed link belonging to the group specified by the group identification, prompting that webpage content pointed by the link contained in the webpage has been browsed.

20 Claims, 13 Drawing Sheets

(56) References Cited

U.S. PATENT DOCUMENTS

| | | | |
|---|---|---|---|
| 2005/0257400 A1* | 11/2005 | Sommerer | G06F 16/954 36/13 |
| 2006/0005014 A1* | 1/2006 | Aura | H04L 9/3236 713/162 |
| 2007/0168331 A1 | 7/2007 | Reddy et al. | |
| 2009/0213750 A1 | 8/2009 | Gorokhov et al. | |
| 2009/0216750 A1* | 8/2009 | Sandoval | G06F 17/30569 |
| 2010/0094878 A1* | 4/2010 | Soroca | G06F 17/30035 707/748 |
| 2011/0202517 A1* | 8/2011 | Reddy | G06F 17/30867 707/706 |
| 2012/0016897 A1 | 1/2012 | Altruik | |
| 2012/0078871 A1 | 3/2012 | Pugh | |
| 2012/0117043 A1 | 5/2012 | Radlinski et al. | |
| 2012/0254188 A1* | 10/2012 | Koperski | G06F 17/30663 707/740 |
| 2012/0272132 A1* | 10/2012 | Mondal | G06F 16/957 715/234 |
| 2014/0181699 A1* | 6/2014 | Godsey | G06F 3/0481 715/760 |

OTHER PUBLICATIONS

Gao, The Strategy on Replicate and Similar Web Collections' Detecting and Clustering, 2009 Wiley Periodicals, Inc. Comput Appl Eng Educ 20: 221-231, 2012.

Method and Apparatus to Optimize the Search Output of Web Search with Duplicated Web Pages Eliminated, The IP.com Prior Art Database, Dec. 4. 2008.

Dahlin et al., Using Bloom Filters to Refine Web Search Results, Eigth International Workshop on the Web and Databases, Jun. 16-17, 2005.

* cited by examiner

300

```
┌─────────────────────────────────────┐
│ Comparing a string code corresponding to │
│ a browsed link with the group identification │
│              S310                   │
└─────────────────────────────────────┘
                  │
                  ▼
┌─────────────────────────────────────┐
│ Determining a browsed link corresponding │
│ to a string code that matches the group │
│ identification as belonging to the group │
│ specified by the group identification │
│              S320                   │
└─────────────────────────────────────┘
```

FIG. 6

| Link | String code | Browse information |
|---|---|---|
| URL1 | 0001-0001-0100 | AAA; February 7, 2013 |

PROCESSING WEBPAGE DATA

CROSS-REFERENCE TO RELATED APPLICATIONS

This application claims priority under 35 U.S.C. § 119 from Chinese Patent Application No. 201310064517.2 filed Feb. 28, 2013, the entire contents of which are incorporated herein by reference.

BACKGROUND OF THE INVENTION

Field of Invention

The present invention relates to the field of information processing, and more specifically, to a method, apparatus and system for processing webpage data in the information processing field.

Description of Related Art

With the development of network techniques and the increase of network resources, more and more users have selected to acquire information through networks. However, different links may point to webpages having duplicated or near duplicated contents. As a result, a user may repeatedly browse substantially the same information, causing a waste of time and affecting user experience.

For example, a webpage A and a webpage B may have several news-related links thereon, respectively. Supposing a link in webpage A and a link in webpage B point to duplicated or near duplicated contents but with different titles. If a user has browsed that link in webpage A, the user may find that he/she has already browsed the content after clicking on the link in webpage B. Because it is difficult for the user to determine beforehand whether the two links point to the similar content according to the links, such links of duplicated contents may cause a waste of the user's time and affect user experience. Furthermore, displaying duplicated contents multiple times on devices with limited power such as mobile devices is not only inefficient, but also a waste of systematic resources.

SUMMARY OF THE INVENTION

Embodiments of the present invention provides a method, apparatus and system for processing webpage data, which are capable of effectively preventing user from repeatedly browsing the same or similar webpage contents In another aspect, it saves systematic resources and improves network processing efficiency and operational speed.

According to one embodiment of the present invention, there is provided a method for processing webpage data, comprising: in response to a webpage being opened, sending a link contained in the webpage to a network side device; receiving a group identification from the network side device, the group identification being determined by the network side device according to the link and used to specify a group the link belongs to; determining whether there is a browsed link belonging to the group specified by the group identification; and in response to determining there is a browsed link belonging to the group specified by the group identification, prompting that webpage content pointed by the link contained in the webpage has been browsed.

According to another embodiment of the present invention, there is provided a method for processing webpage data, comprising: receiving a link contained in a webpage from a user terminal; and in response to determining that the link belongs to one predetermined group among at least one predetermined group, sending a group identification of the predetermined group to the user terminal, so that the user terminal, in response to determining that there is a browsed link belonging to a group specified by the group identification, prompts that webpage content pointed by the link contained in the webpage has been browsed.

According to another embodiment of the present invention, there is provided an apparatus for processing webpage data, comprising: a sending component, configured to in response to a webpage being opened, send a link contained in the webpage to a network side device; a receiving component, configured to receive a group identification from the network side device, the group identification being determined by the network side device according to the link and used to specify a group the link belongs to; a determination component, configured to determine whether there is a browsed link belonging to the group specified by the group identification; and a prompting component, configured to in response to determining there is a browsed link belonging to the group specified by the group identification, prompt that webpage content pointed by the link contained in the webpage has been browsed.

According to another embodiment of the present invention, there is provided an apparatus for processing webpage data, comprising: a receiving component, configured to receive a link contained in a webpage from a user terminal; and a sending component, configured to in response to determining that the link belongs to one predetermined group among at least one predetermined group, send a group identification of the predetermined group to the user terminal, so that the user terminal, in response to determining that there is a browsed link belonging to a group specified by the group identification, prompts that webpage content pointed by the link contained in the webpage has been browsed.

According to another embodiment of the present invention, there is provided a system for processing webpage data, comprising a user terminal and a network side device. The user terminal is configured to in response to a webpage being opened, send a link contained in the webpage to the network side device; receive a group identification from the network side device, the group identification being determined by the network side device according to the link and used to specify a group the link belongs to; determine whether there is a browsed link belonging to the group specified by the group identification; and in response to determining there is a browsed link belonging to the group specified by the group identification, prompt that webpage content pointed by the link contained in the webpage has been browsed. The network side device is configured to receive the link contained in the webpage from the user terminal; and in response to determining that the link belongs to one predetermined group among at least one predetermined group, send the group identification of the predetermined group to the user terminal.

According to the above technical solution, by using a link contained in an opened webpage and a group identification of a group the link belongs to, it can be determined whether there is a browsed link belonging to the group, and a user can be prompted that the webpage content pointed by the link has been browsed when there is a browsed link belonging to the group. Such that, by means of the group identification determined by the network side device and browsed links locally stored in the user terminal, the user can be prompted in advance links that points to duplicated webpage contents, and thus effectively preventing repeated network processes for user clicks on the same or similar webpage contents.

Therefore, systematic resources can be saved, network processing speed can be improved, and network processing capability can be increased.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 6 shows a flowchart of a method for determining whether a browsed link belongs to a group specified by a group identification according to an embodiment of this invention.

DETAILED DESCRIPTION OF THE PREFERRED EMBODIMENTS

Figure 1:
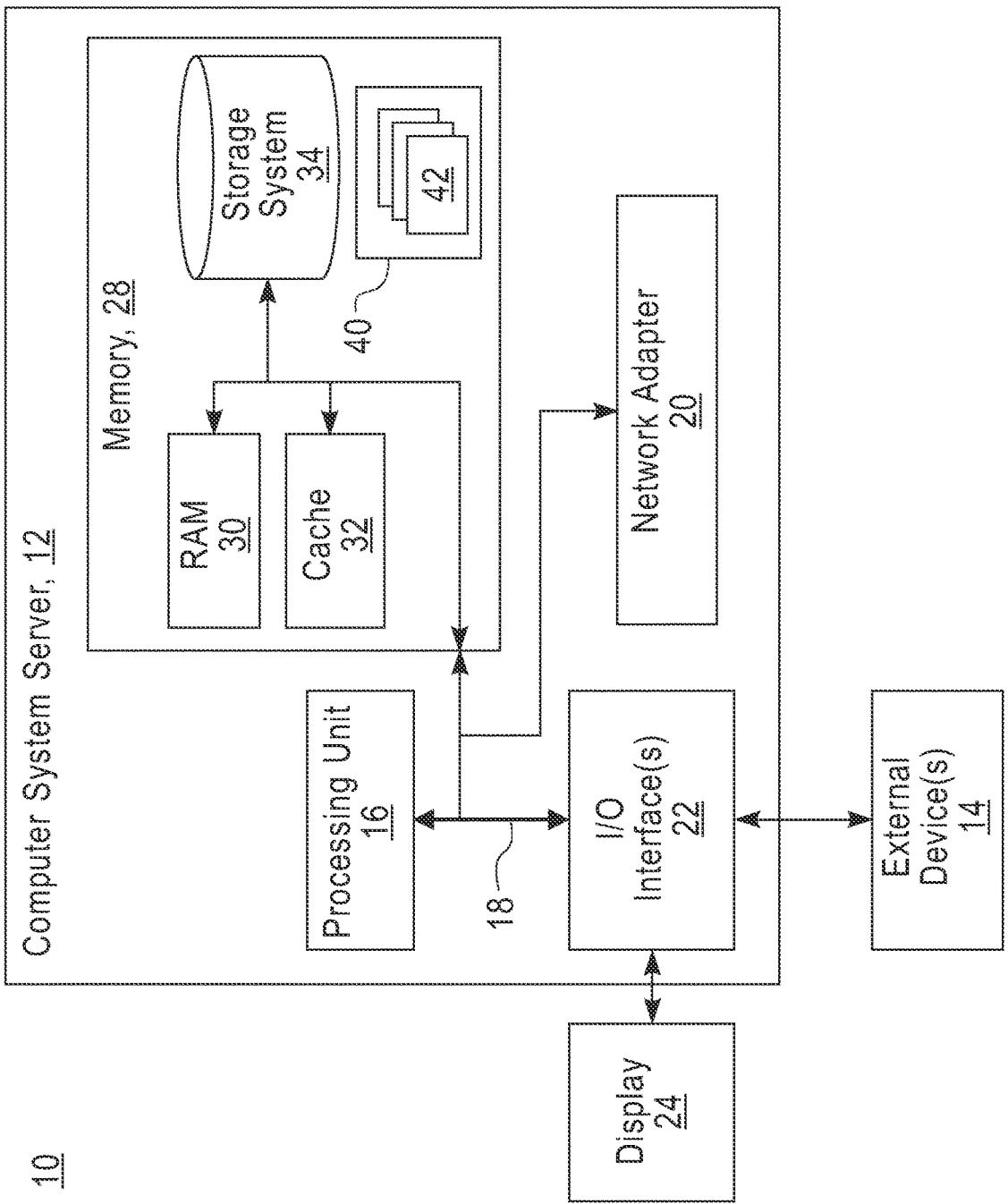
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAidentifier systems, tape drives, and data archival storage systems, etc.

Figure 2:
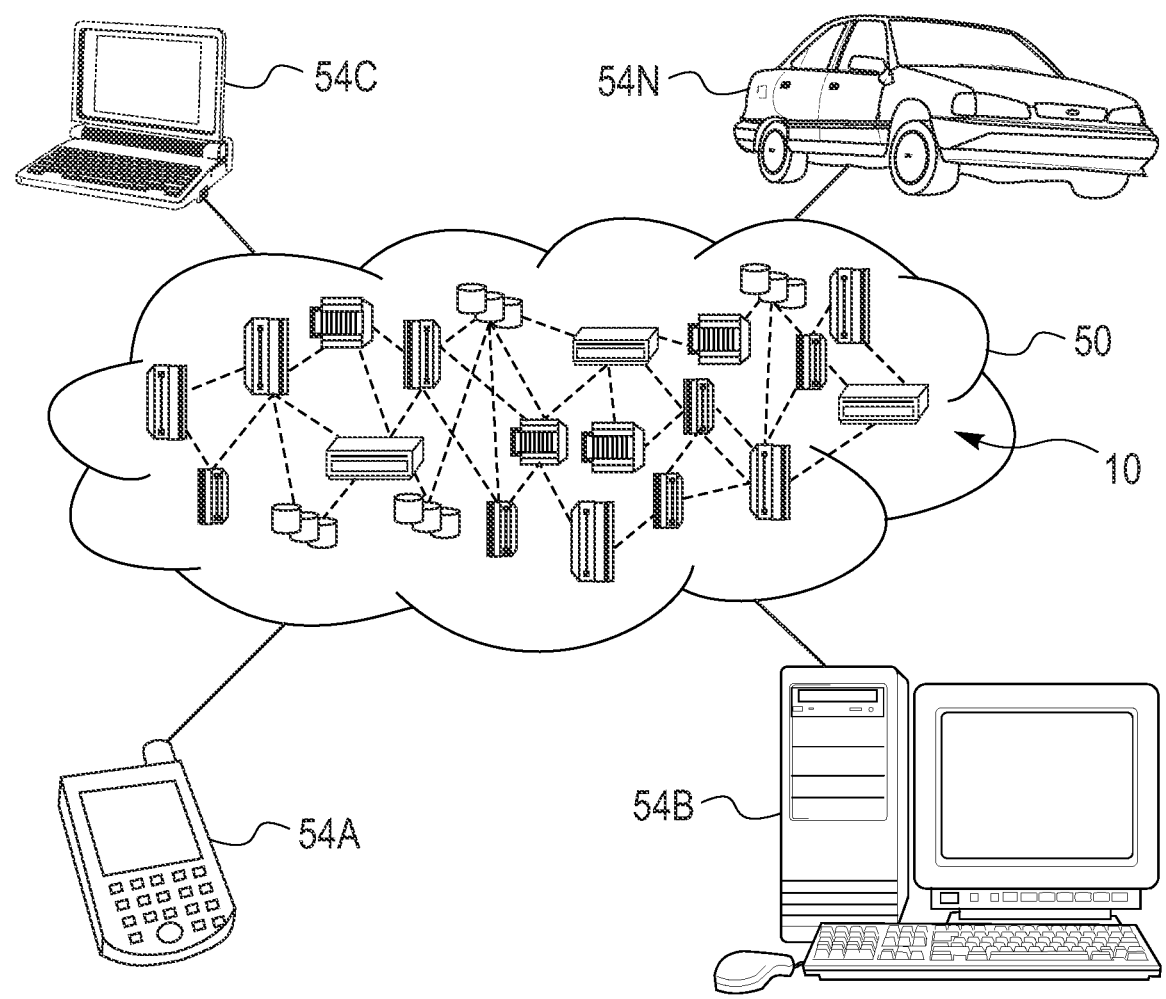
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
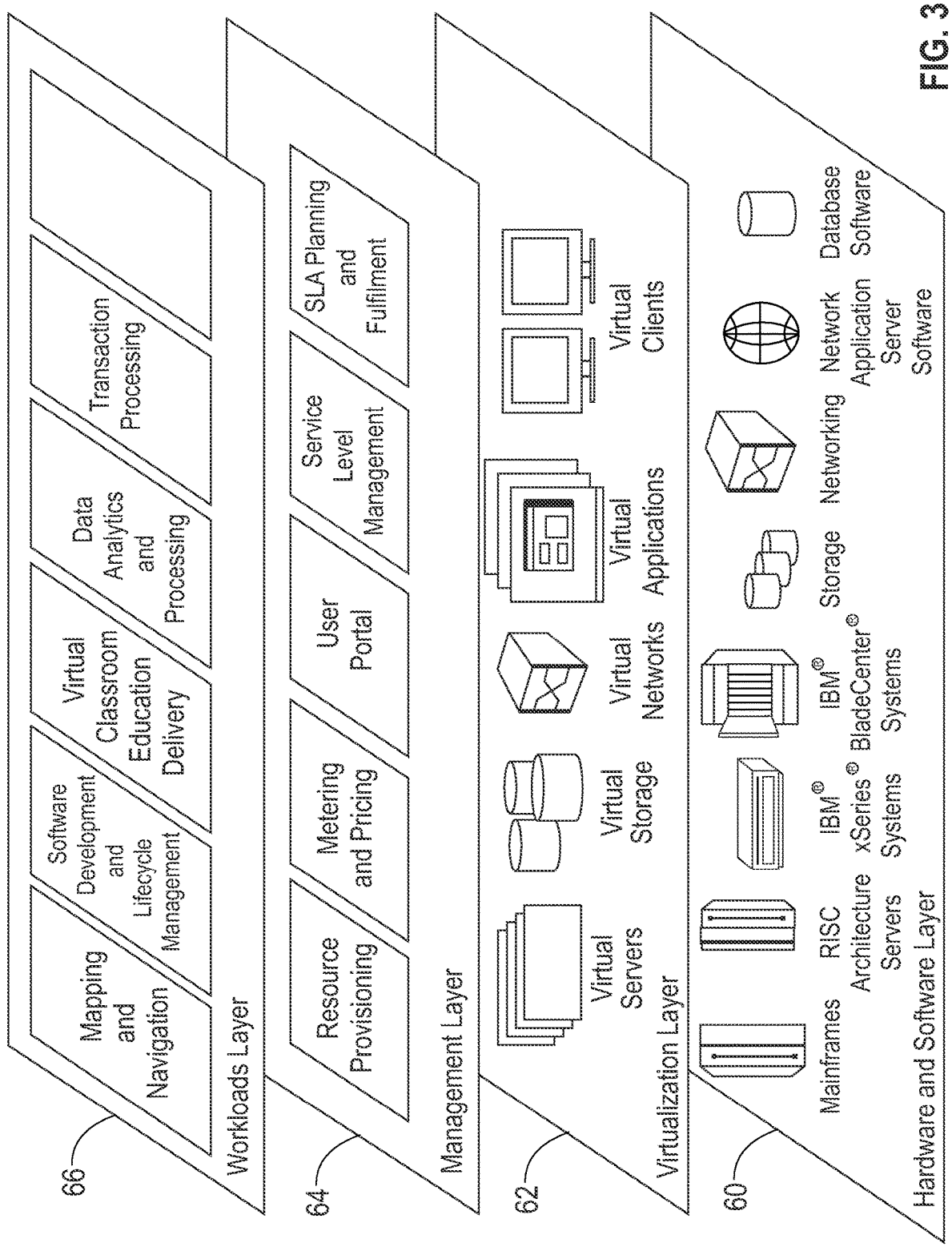
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and duplicated webpage content prompt.

Figure 4:
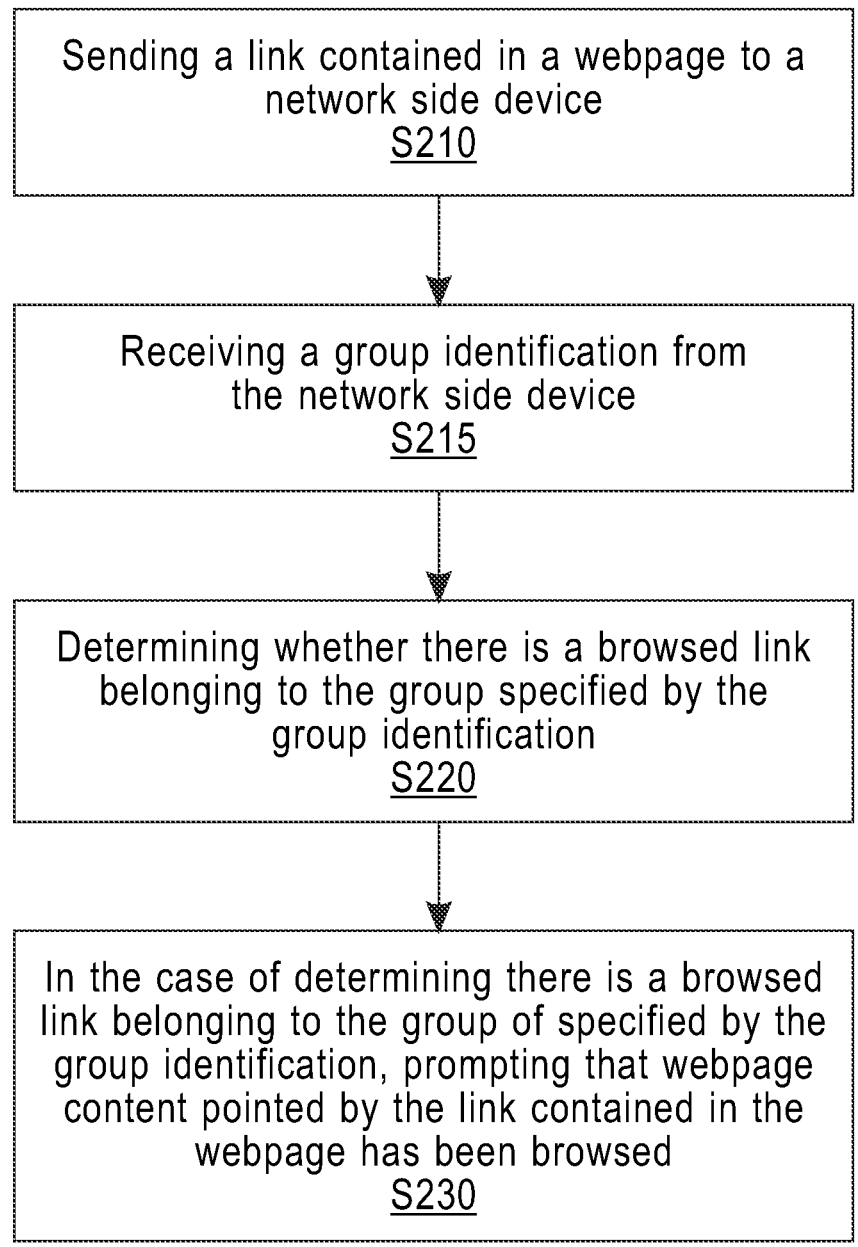
FIG. 4 shows a flowchart of a method for processing webpage data according to an embodiment of this invention.

With reference now to FIG. 4, a flowchart of a method 200 for processing webpage data according to an embodiment of this invention will be described.

As shown in FIG. 4, at step S210, in response to a webpage being opened, a link contained in the webpage is sent to a network side device; at step S215, a group identification is received from the network side device, the group identification being determined by the network side device according to the link, which is used to specify a group the link belongs to; at step S220, it is determined whether there is a browsed link belonging to the group specified by the group identification; and at step S230, in response to determining there is a browsed link belonging to the group specified by the group identification, prompting that a webpage content pointed by the link contained in the webpage has been browsed.

Specifically, for example, the method 200 can be executed by a user terminal such as a computer and a mobile phone that can communicate with the network side device. More specifically, the method 200 can be executed by a client capable of communicating with the network side device, which is installed in the user terminal. The client may be a browser or a plug-in of the browser. The network side device may be one device (such as a server) in a network, or an entirety composed of multiple devices in the network (such as a cloud network). For example, the network side device may be one or more cloud computing nodes 10 of FIG. 2. The user terminal may be any of the PDA or mobile phone 54A, the desktop computer 54B, the notebook computer 54C and the vehicle computer system 54N of FIG. 2.

When a webpage is opened, the user terminal can determine a link contained in the webpage by parsing the programming language of the webpage (such as HyperText Markup Language) and then send the link to the network side device. Herein, a "link" refers to a linking relationship from one webpage to another webpage. By clicking a link on a webpage, another webpage pointed by the link can be opened. A link can be represented as a character string, a text, a picture, a symbol, etc. on a webpage. From the technical standpoint, a link may be an identifier for uniquely identifying the content the link points to, such as a URL (Uniform Resource Locator), URI (Uniform Resource Identifier), or an IP address. For the convenience of description, URL is used as an example of a link for the following description. For example, a news link on a webpage can be represented as "a significant broke in XX technique", which may be "http://news.AAA.com/123.com" from the technical perspective.

After the network side device receives the link sent from the user terminal, it can determine which group the link sent from the user terminal belongs to by searching correspondence relationship between links belonging to a same group and a group identification of the group which is stored in the network side device in advance, and then return the corresponding group identification of the corresponding group to the user terminal.

Figure 5:
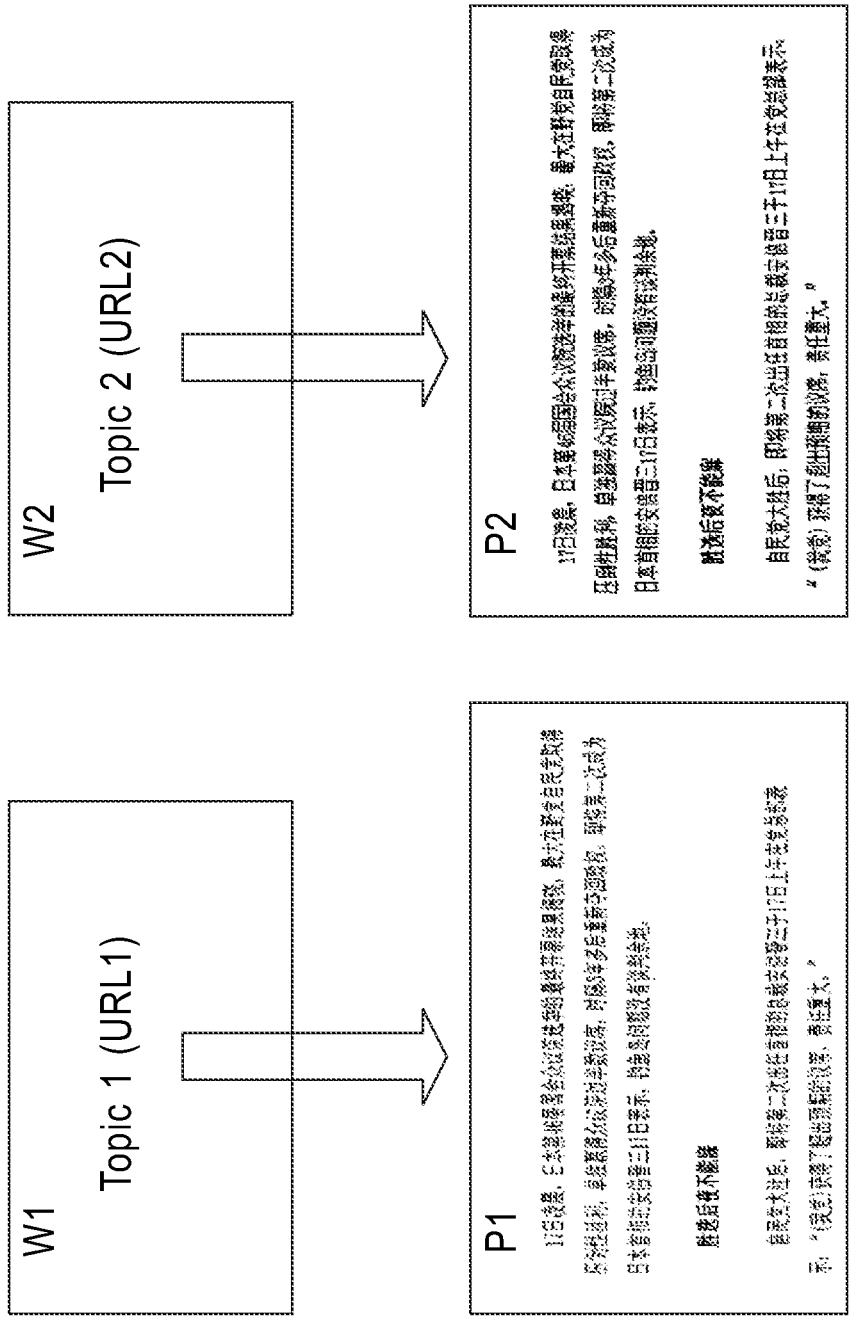
FIG. 5 shows an example of links pointing to the same or similar webpage contents according to an embodiment of this invention.

Links classified into a same group point to webpages having the same or similar contents. For example, an example of contents of a webpage P1 and a webpage P2 pointed by two links URL1 and URL2 that are classified into a group with a group identification G1 is shown in FIG. 5. URL1 is present in webpage W1, and URL2 is present in webpage W2. URL1 is represented as "topic 1" in webpage W1, and URL2 is represented as "topic 2" in webpage W2, wherein "topic 1" may differ from "topic 2". From the technical perspective, for example, URL1 may be "http://news.AAA.com/123.html", and URL2 may be "http://text.BBB.com/af56.html". When URL1 represented as "topic 1" is clicked in webpage W1, a webpage P1 is opened. When URL2 represented as "topic 2" is clicked in webpage W2, a webpage P2 is opened. In this example, webpage P1 and webpage P2 have the same or similar contents. Furthermore, URL1 and URL2 may even be identical, in which case webpage P1 pointed by URL1 and webpage P2 pointed by URL2 are the same webpage.

Currently, there are several known methods for determining whether webpage contents are the same or similar. For example, with respect to two given webpages P1 and P2, first of all, non-text contents such as pictures, icons and the like are removed from webpages P1 and P2, and then text contents of webpages P1 and P2 are compared. When the amount of contents that are substantially the same exceeds a percentage (for example, 80% of the entire text contents), the two webpages are considered as having the same or similar contents. Contents that are substantially the same may be contents that are completely the same, or may be contents with a degree of difference in a predetermined range, or may be contents of a sentence which has a predetermined number of identical text items between two punctuations bounding the sentence.

After the user terminal receives the group identification, it can determine whether there is a link that has been browsed belonging to the group specified by the received group identification, for example, by the steps of a method 300 shown in FIG. 6.

At step S310, a string code corresponding to a browsed link is compared with the group identification. Wherein, the string code corresponding to the browsed link is obtained by applying a function on that link, the function being the same as that for determining a group identification of a group from all links classified into the group.

Specifically, string codes corresponding to browsed links that are stored in the user terminal and group identifications of groups stored in the network side device are generated using the same function. The function can be stored in both of the user terminal and the network side device, respectively. For example, the string codes and the group identifications can be generated using a computing structure similar to the Bloom filter.

According to an embodiment of this invention, the function for calculating string codes and group identifications may be at least one Hash function, each Hash function being in a different form. When a link is processed, the link can be inputted into each Hash function, respectively. Each Hash function processes data uniquely representing the link such as the ASCII code or IP address of the link, and outputs a value based on the link. The output value of the Hash function is used to instruct how to generate a string code or group identification. For example, the string code or group identification can be generated using a computing structure shown in FIG. 6.

In the case of generating a string code corresponding to a link, an initial string code of m bits all of which are 0 is provided for the link in advance. The link (such as URL) is inputted into k Hash functions, respectively. Hash function 1 to Hash function k may output integers h1 to hk valued in a range from 0 to (m−1), respectively. Each of h1 to hk sets a corresponding position in the initial string code to 1. On the other hand, if all bits of the initial string code are 1, each of h1 to hk sets a corresponding position in the initial string code to 0.

For example, when an ASCII code corresponding to a browsed link URL1 which is "http://news.AAA.com/123.html" stored in the user terminal is "FC068E932", the ASCII code is inputted into 3 Hash functions, by which 3, 7, 9 are obtained, respectively. Then, an initial string code "0000-0000-0000" is set to "0001-0001-0100" as a string code corresponding to the link URL1.

In the case of generating a group identification of a group, an initial string code of m bits all of which is zero is provided for the group in advance. For each of n links contained in the group, each link is inputted into k Hash functions, respectively. For each link, Hash function 1 to Hash function k may output integers h1 to hk valued in a range from 0 to (m−1), respectively. Each of h1 to hk sets a corresponding position in the initial string code to 1. If it is required to set a same position to 1 after processing multiple links using the k Hash functions, the position is set to 1 only once. That is to say, after setting a position to 1 for the first time, the position will not be changed further. Similarly, on the other hand, if all bits of the initial string code are 1, each of h1 to hk sets a corresponding position in the initial string code to 0.

For example, when ASCII codes corresponding to a link URL2 which is "http://news.AAA.com/123.html" and a link URL3 which is "http://text.BBB.com/af56.html" contained in a group are "FC068E932" and "AEF586GOC", respectively, the two ASCII codes are inputted into 3 Hash functions in sequence, by which 3, 7, 9 and 0, 3, 10 are obtained, respectively. Then, the initial string code "0000-0000-0000" is set to "1001-0001-0110" as a group identification G1 of the group.

When the initial string code at the user terminal is all-zero, the initial string code at the network side device is all-zero as well. On the contrary, when the initial string code at the user terminal is all-one, the initial string code at the network side device is all-one as well. Further, the initial string code at the user terminal may have the same length as that of the initial string code at the network side device.

By using k Hash functions to represent a group containing n links as an m-bit vector at the network side device, each member of the group can be depicted with a simple and effective data structure, and thus facilitating group membership querying. With the use of Hash functions, input links can be mapped into a range of [0, m−1] with an equal probability, so that large errors resulted from mapping different multiple links to same code positions can be avoided as much as possible.

The False Positive rate caused by the known Bloom filter in membership querying is about $(1-e^{-kb/m})^k$. The minimum False Positive rate can be obtained when $k=\ln 2(m/n)$. Therefore, in the structure according to the embodiment of this invention, m, n and k may be determined from the above known conclusion. For example, the number of links that can be classified together into a same group may be set to 1000, the number of Hash functions to which a link should be inputted simultaneously is 5, and the length of both the string code and the group identification is 10000 bits.

At step S320, a browsed link corresponding to a string code that matches with the group identification is determined as belonging to a group specified by the group identification.

A string code matching with a group identification may include, in the case that an initial string code is all-zero, the positions in the group identification which correspond to the positions set to 1 in the string code corresponding to a browsed link are set to 1. Or, a string code matching with a group identification may include, in the case that an initial string code is all-one, the positions in the group identification which correspond to the positions set to 0 in the string code corresponding to a browsed link are set to 0.

According to an embodiment of this invention, whether a browsed link belongs to a group specified by a group identification can be determined as follows. In the case that the initial string code is all-zero, first of all, the positions that are set to 1 in a string code corresponding to the browsed link may be determined (for example, A1, A4 and A5). Then, values on those positions (for example, A1, A4 and A5) in the group identification are determined, after which the determined values are compared with 1. If the values on those positions in the group identification are also set to 1, it can be determined that the browsed link belongs to the group specified by the group identification. On the other hand, in the case that the initial string code is all-one, first of all, the positions that are set to 0 in a string code corresponding to the browsed link may be determined (for example, B1, B4 and B5). Then, values on those positions (for example, B1, B4 and B5) in the group identification are determined, after which the determined values are compared with 0. If the values on those positions in the group identification are also set to 0, it can be determined that the browsed link belongs to the group specified by the group identification.

In the above example, because the positions, which are set to 1 in the string code "0001-0001-0100" corresponding to the browsed link URL1 at the user terminal, are also set to 1 in the group identification "1001-0001-0110" of the group containing links URL2 and URL3, the browsed link belongs to the group.

In order to determine the string code corresponding to the link at step S310, when opening a webpage, the user terminal may store the link of the webpage and its corresponding string code in association as a browsing history record.

For example, in the case of opening a webpage P1 having a link URL1 "http://news.AAA.com/123.html" (for example, by clicking on the link of the webpage, or directly entering the above link or its IP address or domain name in the address field), the link URL1 of webpage P1 turns to a browsed link. For the link URL1 of the webpage, a string code "0001-0001-0100" is calculated with the structure shown in FIG. 7, which is stored as a browsing history record in association with URL1.

Figures 7, 8:
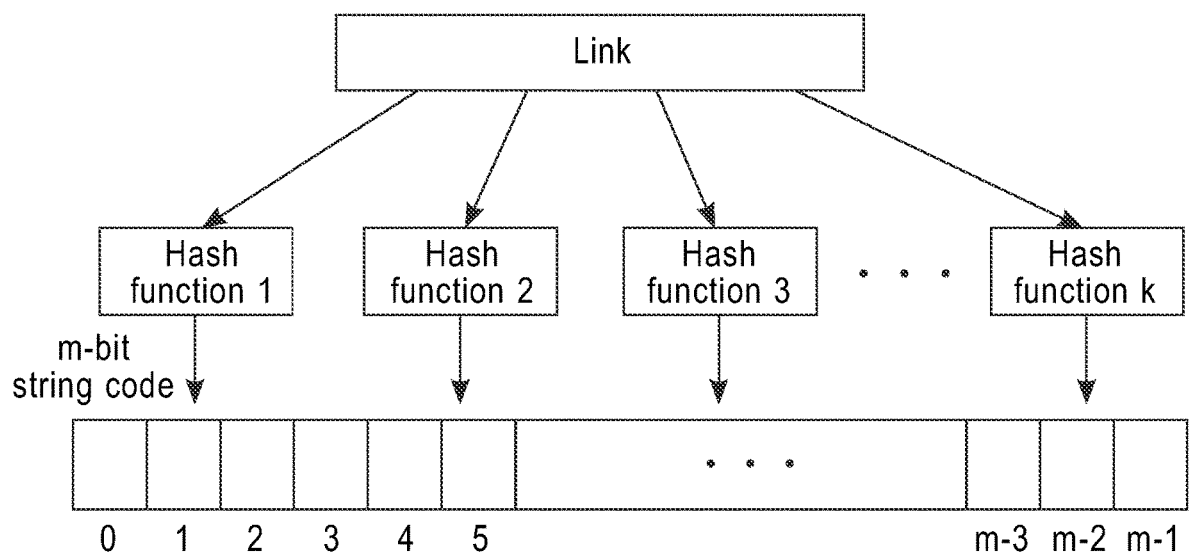
FIG. 7 shows a schematic diagram of an example of a computing structure for generating a string code and a group identification according to an embodiment of this invention.
FIG. 8 shows an example of storing a browsed link according to an embodiment of this invention.

Furthermore, according to an embodiment of this invention, the user terminal may further store browse information related to the opened webpage in association with the link of the webpage. For example, the user terminal may store the link of an opened webpage in association with a string code corresponding to the link and browse information about the webpage as a browsing history record. The browse information about the webpage may depict one or more of when or where the user has browsed the webpage or the source of the webpage. How to store a browsed link is shown in FIG. 8 with URL1 as an example. When URL1 "http://news.AAA.com/123.html" is clicked to be opened, the source AAA of the webpage pointed by URL1 and a browse date of Feb. 7, 2013 are recorded as the browse information.

In the case of having browse information recorded, the user terminal may prompt the user that the webpage content pointed by a link contained in a webpage has been browsed by outputting browse information associated with the browsed link determined at S320.

For example, as shown in FIG. 5, assume that the user has clicked a link URL1 "http://news.AAA.com/123.html" contained in webpage W1 and has browsed webpage P1 pointed by the link URL1. When the user terminal newly opens another webpage W2, the user terminal sends a link URL2 "http://text.BBB.com/af56.html" contained in the newly opened webpage W2 to the network side device. The network side device returns to the user terminal a group identification "1001-0001-0110" of a group which the link URL2 belongs to. Because a string code "0001-0001-0100" corresponding to the link URL1 among browsed links stored at the user terminal matches with the group identification "1001-0001-0110" of the group the link URL2 belongs to, it indicates that the webpage content pointed by URL2 is substantially the same as the webpage content pointed by URL1. Because the webpage content corresponding to URL1 has been browsed, browse information associated with URL1 (for example, its source AAA) can be outputted adjacent to the "Topic 2" of the link URL2, to prompt the user that the content has been browsed. It is a matter of course that, by changing the link (for example, URL2) whose pointed content has been browsed and which has not yet been clicked in terms of its color, font, animation effect, etc, the information indicating the webpage content pointed by the link has been browsed may be prompted.

A description has been given above with the webpage W2 containing one link URL2 as an example. When there are more than one links in the webpage, the user terminal may send all of these links to the network side device. The network side device returns group identifications respectively corresponding to these links, so that the user terminal may determine whether the content of each link in the webpage has been browsed respectively.

By determining whether different links point to the same or similar webpage content with the assistance of group identification, the user may be effectively prevented from repeatedly browsing duplicated contents, and the user terminal may be avoided from displaying duplicated contents multiple times. Thus, systematic resources can be saved and user experience can be improved.

The method according to embodiments of this invention has been described above from the perspective of the user terminal. Next, the method according to embodiments of this invention will be described from the perspective of the network side device. The network side device may be one or more devices in any network, for example, one or more servers. When the network side device comprises more than one device, these devices may be regarded as a whole to be the network side device. For example, in a cloud network, the network side device may be composed of multiple nodes.

Figure 9:
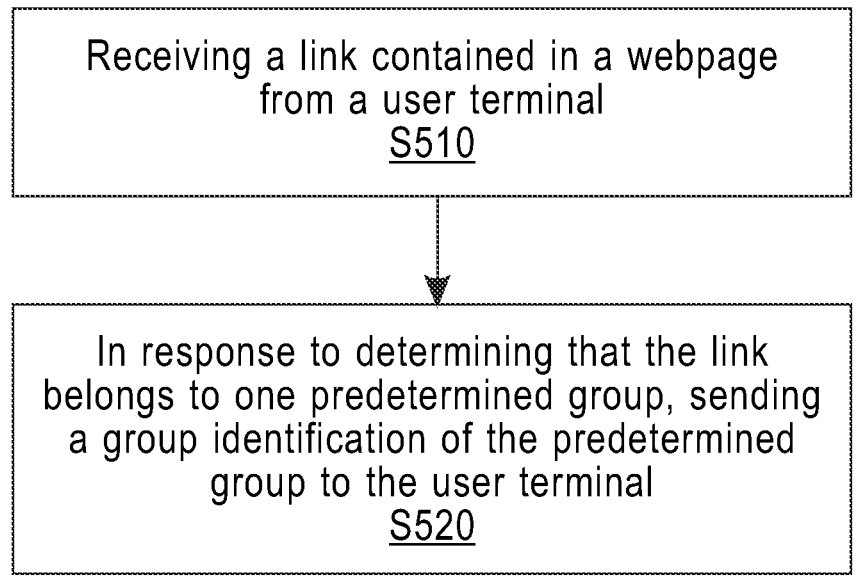
FIG. 9 shows a flowchart of another method for processing webpage data according to an embodiment of this invention.

In a method 500 for processing webpage data according to an embodiment shown in FIG. 9, at step S510, a link contained in a webpage is received from a user terminal; and at step S520, in response to determining that the link belongs to one predetermined group among at least one predetermined groups, sending a group identification of the predetermined group to the user terminal, so that the user terminal prompts that the webpage content pointed by the link contained in the webpage has been browsed, in response to determining that there is a browsed link belonging to the group specified by the group identification. Wherein, links belonging to a same predetermined group point to the same or similar webpage content.

For the operations of steps S510 and S520, reference can be made to the description of FIG. 4 to FIG. 8 above. By returning to the user terminal a group identification of a group a link in a webpage that may be clicked belongs to, the network side device may help the user terminal to determine whether the content pointed by the link has been browsed, so as to prevent the user from repeatedly browsing the same or similar content, and to avoid the user terminal from displaying duplicated contents repeatedly. Thus, user experience can be improved, and systematic resources can be saved.

Figure 10:
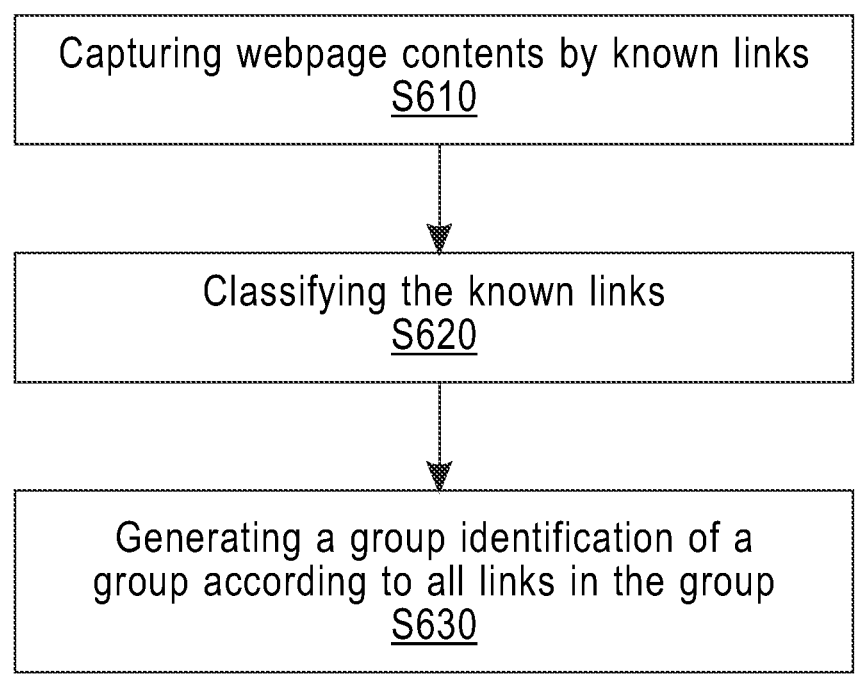
FIG. 10 shows a flowchart of a method for determining a group and its corresponding group identification according to an embodiment of this invention.

According to an embodiment of this invention, the network side device may determine in advance predetermined groups and their corresponding group identifications by a method 600 shown in FIG. 10.

At step S610, webpage contents pointed by known links are captured. Specifically, the network side device may capture all the webpage contents pointed by all the known links.

At step S620, by calculating similarities of the webpage contents captured at S610, these known links are classified, so that links classified into a same group point to the same or similar webpage contents.

The method for calculating webpage content similarity may adopt the above described known method. Then, the links that are determined as pointing to the same or similar webpage contents can be classified into one group. Known clustering methods can be used to cluster these known links according to webpage content similarity to obtain different groups. For example, according to webpage content similarity, points representing different links can be represented in a coordinate system, and two points with a distance therebetween lower than a predetermined threshold can be classified into a same group.

At step S630, for each group obtained at S620, a group identification is produced for the group according to all links in the group, and the group identification of the group is stored in association with all the links in the group.

For example, the group identification of a group can be produced by applying at least one Hash function to all links in the group. Specifically, each of all the links classified into the group can be inputted into the at least one Hash function, so that corresponding positions in an all-zero initial string code configured for the group in advance can be set to 1 by each output of the at least one Hash function, or corresponding positions in an all-one initial string code configured for the group in advance can be set to 0 by each output of the at least one Hash function. The above description can be referred to for the specific operation.

According to an embodiment of this invention, if the network side device does not find a group identification of a group the link received at S510 belongs to, that is, if the link has not been classified, the network side device may classify the link. Specifically, according to the similarity between the webpage content pointed by the link and the webpage contents pointed by links in existing predetermined groups (i.e., the at least one predetermined group at step S520), the link is classified.

If the link can be classified into one predetermined group, the group identification of the group is updated. For example, the link is inputted into the computing structure shown in FIG. 7 to set corresponding positions in the group identification of the predetermined group to 1 (in the case of an all-zero initial string code) or 0 (in the case of an all-one initial string code) according to the output results of the Hash functions.

If the link cannot be classified into any predetermined group, a new group is produced separately for the link, and a group identification of the group is calculated, which is then stored in association with the link.

By continuously updating group identifications, contents newly present in the network can be traced, and thus facilitating more comprehensive determination about whether different links point to the same or similar webpage contents. Hence, the user can be prompted of the presence of duplicated network contents more effectively, and a waste of systematic resources resulted from opening webpages having duplicated contents by the user terminal can be further avoided.

Figure 11:
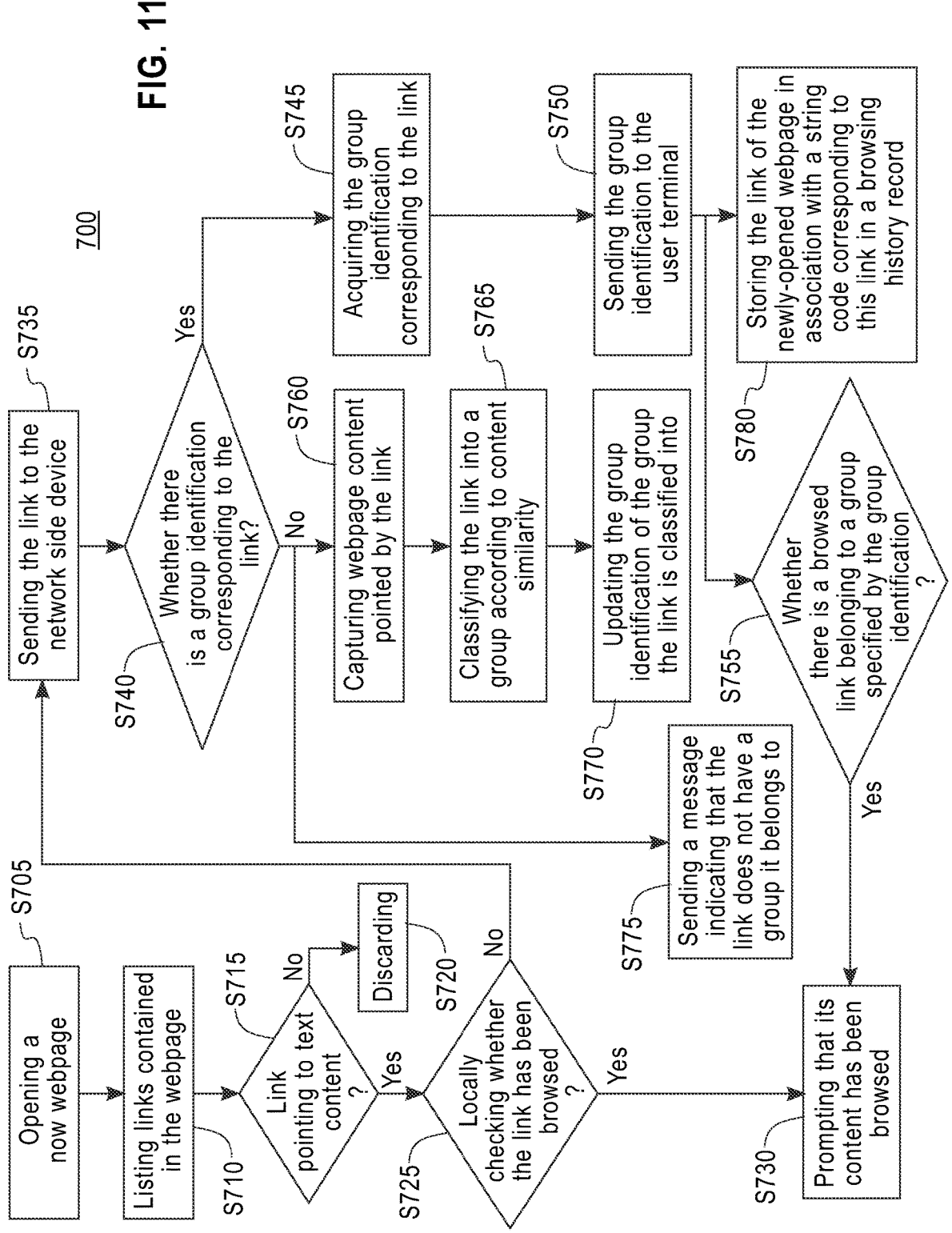
FIG. 11 shows a flowchart of a further method for processing webpage data according to an embodiment of this invention.

Next, a flowchart of a method 700 for processing webpage data to avoid browsing the same or similar webpage contents repeatedly according to an embodiment of this invention will be described at a system level with reference to FIG. 11.

At step S705, a new webpage is opened by a user terminal.

At step S710, links contained in the webpage are listed by the user terminal.

At step S715, the user terminal determines whether a link corresponds to text-containing webpage content. For example, whether a link corresponding to text-containing webpage content can be determined by referring to the suffix of the link and so on. If the link does not correspond to text-containing webpage content (for example, the link is a link about audio, pictures and/or video content), the process proceeds to step S720; otherwise, the process proceeds to step S725. Herein, text-containing webpage content refers to webpage content having text or other character strings as its principle content or beyond 50% of the whole content.

At step S720, links that do not correspond to text-containing webpage content are discarded.

At step S725, for a link corresponding to text-containing webpage content, the user terminal locally checks whether the link has been browsed. For example, browsing history records are looked up to find whether the link is stored therein.

At step S730, if the link is stored in the browsing history records, the link is labeled as "duplicated content" or with other information for prompting that its content has been browsed. It is a matter of course that the prompt can be performed by varying the color, font, etc. of the link.

Note that steps S715, S720 and S725 can be ignored also.

At step S735, if the link is not stored in the browsing history records, the user terminal sends the link (such as its URL) to the network side device (for example, one node or an integral composed of multiple nodes in a cloud network).

At step S740, the network side device determines whether there is a group identification corresponding to the link. If the network side device determines that there is a group identification corresponding to the link, the process proceeds to step S745; otherwise, the process proceeds to steps S760 and S775.

At step S745, the group identification corresponding to the link is acquired, for example, an m-bit string code produced using k Hash functions.

At step S750, the network side device sends the group identification to the user terminal.

At step S755, the user terminal compares the group identification with string codes corresponding to the browsed links locally stored, to determine whether there is a browsed link belonging to a group specified by the group identification.

If it is determined at step S755 that there is a browsed link belonging to the group specified by the group identification, the process proceeds to step S730 to prompt that the webpage content pointed by the link corresponding to text-containing webpage content has been browsed. Otherwise, no operation is executed.

At step S760, because there is no corresponding group identification for the link, the network side device captures webpage content pointed by the link.

At step S765, the network side device classifies the link into a group according to content similarity.

At step S770, the group identification of the group the link is classified into is updated.

At step S775, the network side device returns the user terminal a message indicating that the link does not have a group it belongs to, and thereby prompts the user terminal that the webpage content pointed by the link has not been browsed. Step S775 does not have temporal limits on other steps, so long as it is executed after step S740. Step S775 can be omitted also.

At step S780, the user terminal stores the link of the newly-opened webpage at step S705 in association with a string code corresponding to this link in a browsing history record. Although step S780 is executed after step S770 as shown in FIG. 11, S780 does not have temporal limits on other steps, so long as it is executed after S705.

According to the method for processing webpage data provided in an embodiment of this invention, duplicated webpage contents can be prompted to the user, and thus avoiding a waste of time and degradation of user experience resulted from clicking a link by the user to watch a browsed content, while preventing a waste of resources caused by opening webpages having duplicated contents by the user terminal. Because only a group identification is transmitted between the user terminal and the network side device rather than links belonging to a same group, network bandwidth can be saved. Besides, since group information may be represented as a string code obtained by using Hash functions, it is possible to represent as much information as possible with as a less amount of data as possible, so that information transmission efficiency can be improved. Further, at the user terminal, it is only required to compare a string code corresponding to a browsed link with a group identification to determine whether same or similar content has been browsed, the user terminal is enabled to detect duplicated contents rapidly, with a simplified determination process at the user terminal as well, which may further save systematic overheads. Also, because duplicated contents can be prompted visually by means of browse information, user experience can be further improved while browsing duplicated contents can be avoided.

Next, block diagrams of apparatuses 800 to 1100 and a system 1200 for processing webpage data that can realize the above methods according to embodiments of this invention will be described.

Figure 12:
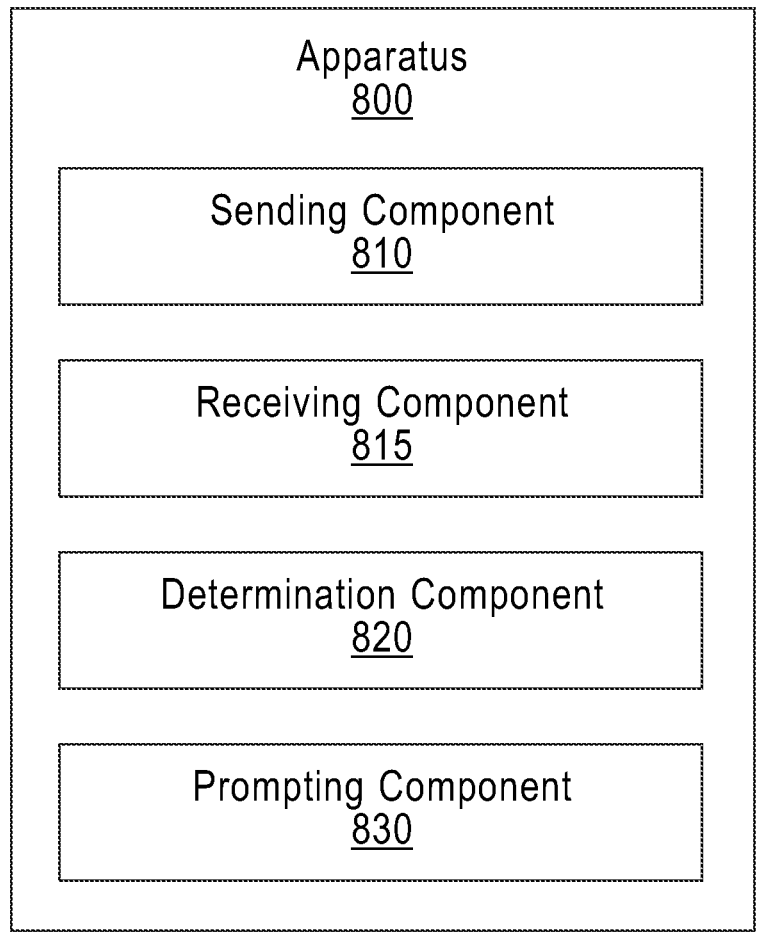
FIG. 12 shows a block diagram of an apparatus for processing webpage data according to an embodiment of this invention.

As shown in FIG. 12, the apparatus 800 for processing webpage data may be a user terminal, or may be a client or other functional module installed in the user terminal. The apparatus 800 may comprise a sending component 810, a receiving component 815, a determination component 820 and a prompting component 830. The sending component 810 may be configured to in response to a webpage being opened, send a link contained in the webpage to a network side device. The receiving component 815 may be configured to receive a group identification from the network side device, the group identification being determined by the network side device according to the link and used to specify a group the link belongs to. The determination component 820 may be configured to determine whether there is a browsed link belonging to the group specified by the group identification. The prompting component 830 may be configured to in response to determining there is a browsed link belonging to the group specified by the group identification, prompt that webpage content pointed by the link contained in the webpage has been browsed.

For the above and other operations and/or functions of the sending component 810, the receiving component 815, the determination component 820 and the prompting component 830, reference can be made to the description of FIG. 4 to FIG. 11 as above, which will not be described in detail to avoid repetition.

By using the group identification returned from the network side device and local links, the apparatus for processing webpage data according to the embodiment of this invention may prompt the user of a link pointing to duplicated content beforehand, and thus effectively avoiding the user from repeatedly browsing the same or similar contents. Thus, systematic resources can be saved and user experience can be improved.

Figure 13:
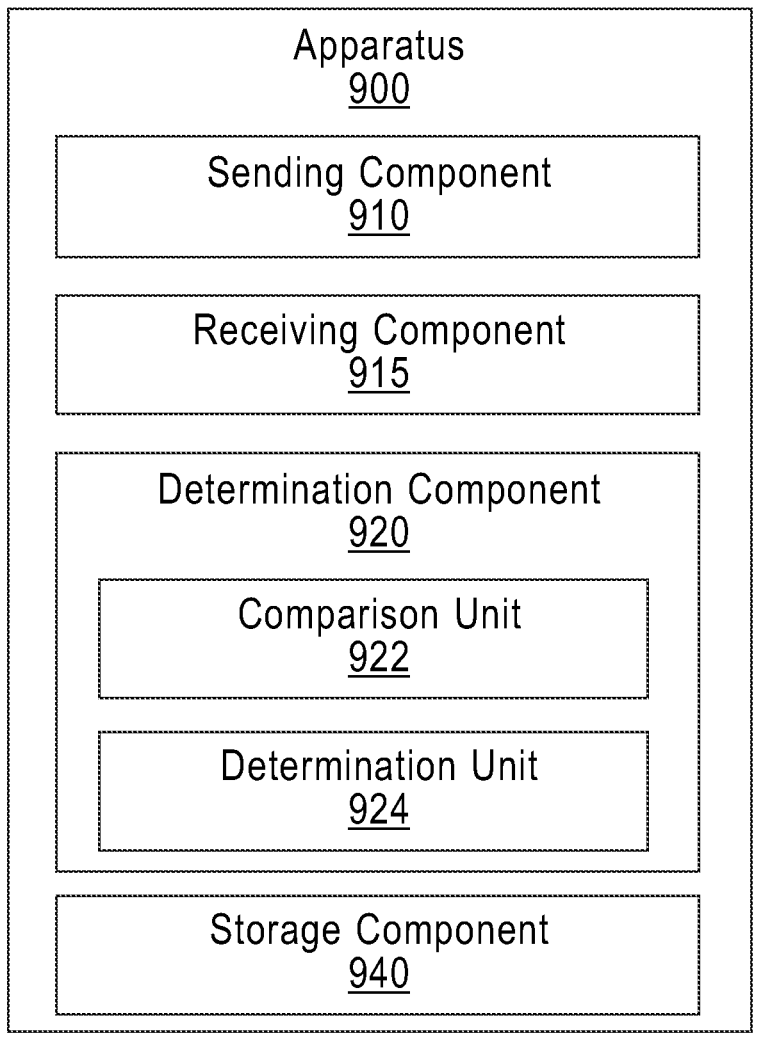
FIG. 13 shows a block diagram of another apparatus for processing webpage data according to an embodiment of this invention.

A sending component 910, a receiving component 915, a determination component 920 and a prompting component 930 in an apparatus 900 for processing webpage data as shown in FIG. 13 are substantially the same as the sending component 810, the receiving component 815, the determination component 820 and the prompting component 830 in the apparatus 800 as shown in FIG. 12.

According to an embodiment of this invention, the determination component 920 may comprise a comparison unit 922 and a determination unit 924. The comparison unit 922 may be configured to compare a string code corresponding to a browsed link with the group identification. The determination unit 924 may be configured to determine a browsed link corresponding to a string code that matches the group identification as belonging to the group specified by the group identification. Wherein, the string code corresponding to the browsed link is obtained by applying the same function to the browsed link as that for obtaining the group identification of the group according to all links classified into the group.

According to an embodiment of this invention, the function may be at least one Hash function. The string code corresponding to the browsed link may be obtained by the following: inputting the browsed link to the at least one Hash function, so that corresponding positions in an initial string code having a first value on all of its positions provided for the browsed link in advance are set to a second value according to results output from each of the at least one Hash function. The group identification of the group may be obtained by the following: inputting each of all the links classified into the group to the at least one Hash function, so that corresponding positions in an initial string code having the first value on all of its positions provided for the group in advance are set to the second value according to results output from each of the at least one Hash function. Wherein, the first value and the second value may be values selected from 0 and 1, and the second value differs from the first value.

According to an embodiment of this invention, an ASCII code or IP address of the link may be inputted to the at least one Hash function.

According to an embodiment of this invention, the comparison unit 922 may be configured to determine the positions set to the second value in the string code corresponding to the browsed link, and to determine values on the determined positions of the group identification, and compare the values with the second value. In this case, the determination unit 924 may be configured to in response to determining that the values on the determined positions of the group identification are also set to the second value, determine that the browsed link belongs to the group specified by the group identification.

According to an embodiment of this invention, the apparatus 900 may further comprise a storage component 940. The storage component 940 may be configured to in the case of the webpage being opened, store a link of the webpage in association with a string code corresponding to the link of the webpage as a browsing history record.

According to an embodiment of this invention, the storage component 940 may specifically configured to store the link of the webpage in association with the string code corresponding to the link of the webpage and browse information for the webpage as the browsing history record. In this case, the prompting component 930 may be configured to prompt that the webpage content pointed by the link contained in the webpage has been browsed by outputting the browse information associated with the browsed link.

For the above and other operations and/or functions of the comparison unit 922, the determination component 924, the prompting component 930, and the storage component 940, reference can be made to the description of FIG. 4 to FIG. 11 as above, which will not be described in detail to avoid repetition.

The apparatus for processing webpage data provided in an embodiment of this invention can prompt the user of duplicated webpage contents, and thus avoiding a waste of time and degradation of user experience resulted from clicking a link by the user to watch a browsed content, while preventing a waste of resources caused by opening webpages having duplicated contents by the user terminal. Because only a group identification is transmitted between the apparatus and the network side device rather than links belonging to a same group, network bandwidth can be saved. Besides, since group information may be represented as a string code obtained by using Hash functions, it is possible to represent as much information as possible with as a less amount of data as possible, so that information transmission efficiency can be improved. Further, at the apparatus, it is only required to compare a string code corresponding to a browsed link with a group identification to determine whether same or similar content has been browsed, the apparatus is enabled to detect duplicated contents rapidly, with a simplified determination process at the apparatus as well, which may further save systematic overheads. Also, because duplicated contents can be prompted visually by means of browse information, user experience can be further improved while browsing duplicated contents can be avoided.

Figure 14:
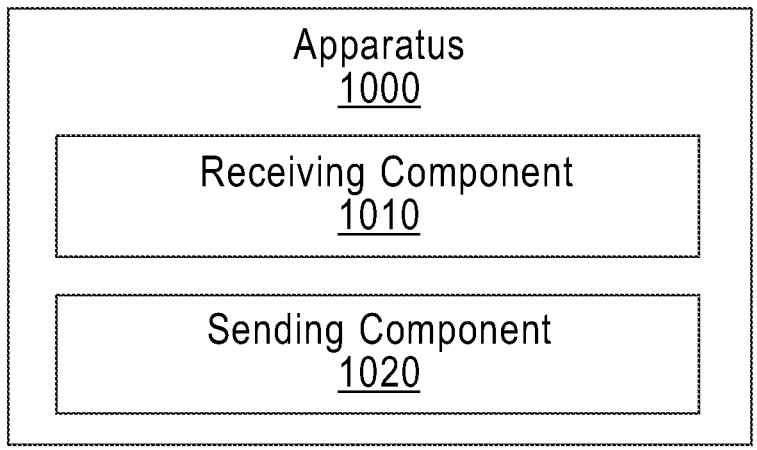
FIG. 14 shows a block diagram of a further apparatus for processing webpage data according to an embodiment of this invention.

As shown in FIG. 14, the apparatus 1000 for processing webpage data may be a network side device, or may be a functional module installed in the network side device. The apparatus 100 may comprise a receiving component 1010 and a sending component 1020. The receiving component 1010 may be configured to receive a link contained in a webpage from a user terminal. The sending component 1020 may be configured to in response to determining that the link belongs to one predetermined group among at least one predetermined group, send a group identification of the predetermined group to the user terminal, so that the user terminal, in response to determining that there is a browsed link belonging to a group specified by the group identification, prompts that webpage content pointed by the link contained in the webpage has been browsed.

For the above and other operations and/or functions of the receiving component 1010 and the sending component 1020, reference can be made to the description of FIG. 4 to FIG. 11 as above, which will not be described in detail to avoid repetition.

By returning to the user terminal a group identification of a group a link in a webpage that may be clicked belongs to, the apparatus for processing webpage data provided in the embodiment of this invention may help the user terminal to determine whether content pointed by the link has been browsed, and thus preventing the user from repeatedly browsing the same or similar content, and avoiding the user terminal to display duplicated contents repeatedly. Thus, user experience can be improved, and systematic resources can be saved.

Figure 15:
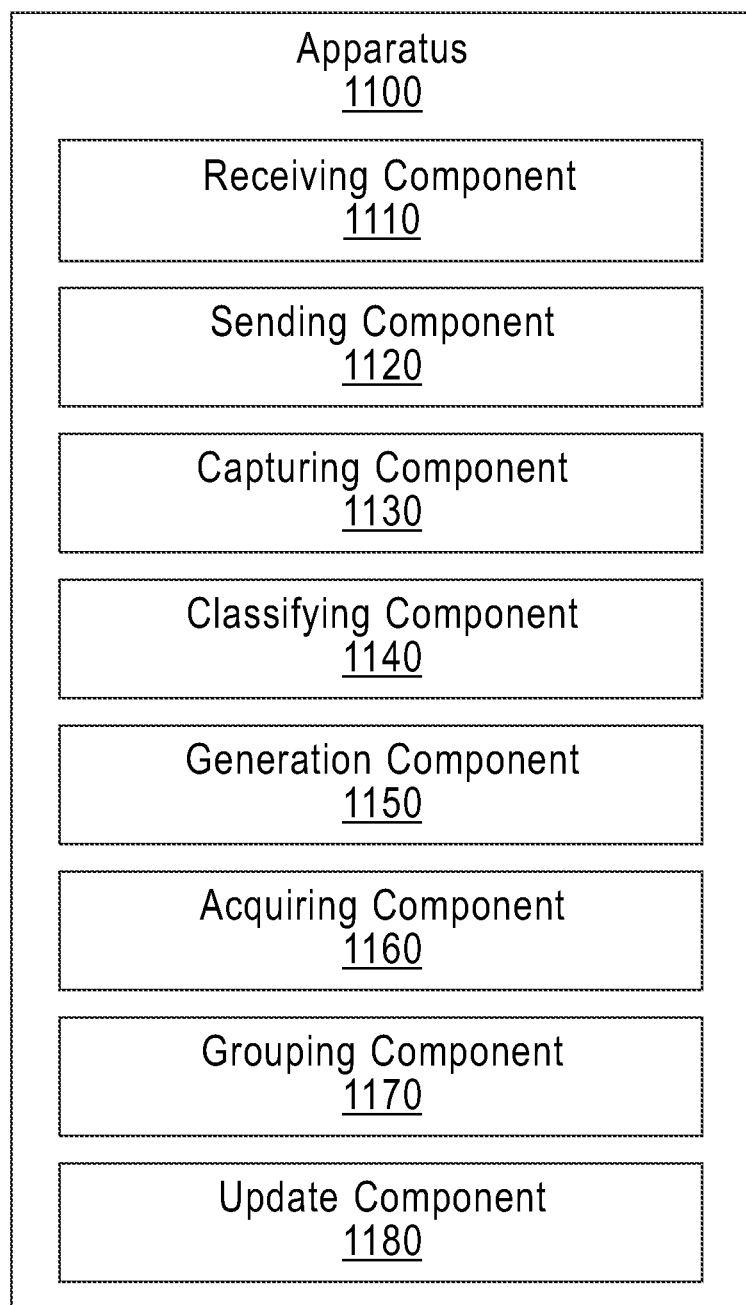
FIG. 15 shows a block diagram of still another apparatus for processing webpage data according to an embodiment of this invention.

A receiving component 1110 and a sending component 1120 in the apparatus 1100 for processing webpage data as shown in FIG. 15 are substantially the same as the receiving component 1010 and the sending component 1020 in the apparatus 1000 as shown in FIG. 14.

According to an embodiment of this invention, the apparatus 1100 may further comprise a capturing component 1130, a classifying component 1140, and a generation component 1150. The capturing component 1130 may be configured to capture webpage contents pointed by known links. The classifying component 1140 may be configured to classify the known links by calculating similarity among the webpage contents, so that the links that are classified into a same group point to same or similar webpage content, wherein the at least one predetermined group is obtained by the classification. The generation component 1150 may be configured to generate, for each group, a group identification of the group according to all links in the group, and storing the group identification of the group in association with all the links in the group.

According to an embodiment of this invention, the generation component 1150 may be specifically configured to generate the group identification of the group by applying at least one Hash function to all the links in the group. The group identification of the group may be obtained by the following: inputting each of all the links classified into the group to the at least one Hash function, so that corresponding positions in an initial string code having a first value on all of its positions provided for the group in advance are set to a second value according to results output from each of the at least one Hash function. Wherein, the first value and the second value may be values selected from 0 and 1, and the second value differs from the first value.

According to an embodiment of this invention, the apparatus 1100 may further comprise an acquiring component 1160, a grouping component 1170, and an update component 1180. The acquiring component 1160 may be configured to in response to determining that the link does not belong to any predetermined group, acquire webpage content pointed by the link. The grouping component 1170 may be configured to classify the link according to similarity between the webpage content pointed by the link and webpage contents pointed by the links in the at least one predetermined group. The update component 1180 may be configured to in response to classifying the link to a predetermined group, update the group identification of the predetermined group.

For the above and other operations and/or functions of the capturing component 1130, the classifying component 1140, the generation component 1150, the acquiring component 1160, the grouping component 1170, and the update component 1180, reference can be made to the description of FIG. 4 to FIG. 11 as above, which will not be described in detail to avoid repetition.

By continuously updating group identifications, the apparatus for processing webpage data provided in embodiments of this invention can trace contents newly present in the network, and thus facilitating more comprehensive determination about whether different links point to the same or similar webpage contents. Hence, the user can be prompted of the presence of duplicated network contents more effectively, and a waste of systematic resources resulted from opening webpages having duplicated contents by the user terminal can be further avoided.

Figure 16:
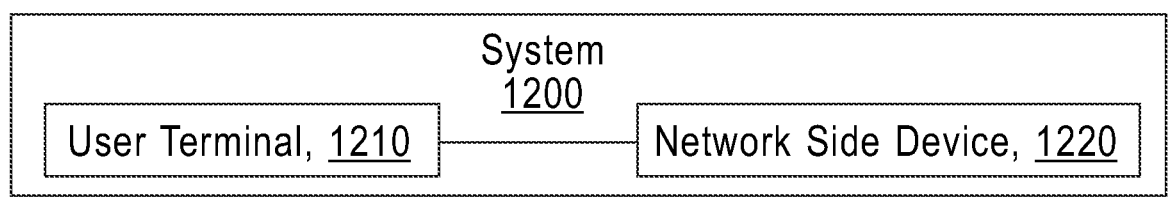
FIG. 16 shows a block diagram of a system for processing webpage data according to an embodiment of this invention.

The system 1200 for processing webpage data according to an embodiment of this invention is shown in FIG. 16. The system 1200 may comprise a user terminal 1210 and a network side device 1220. The user terminal 1210 may be configured to in response to a webpage being opened, send a link contained in the webpage to the network side device 1220; receive a group identification from the network side device 1220, the group identification being determined by the network side device 1220 according to the link and used to specify a group the link belongs to; determine whether there is a browsed link belonging to the group specified by the group identification; and in response to determining there is a browsed link belonging to the group specified by the group identification, prompt that webpage content pointed by the link contained in the webpage has been browsed. The network side device 1220 may be configured to receive the link contained in the webpage from the user terminal 1210; and in response to determining that the link belongs to one predetermined group among at least one predetermined group, send the group identification of the predetermined group to the user terminal 1210. For the above and other operations and/or functions of the user terminal 1210 and the network side device 1220, reference can be made to the description of FIG. 4 to FIG. 11 as above, which will not be described in detail to avoid repetition.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing webpage data, comprising:
in response to a first webpage being opened, sending, by a processor of a user terminal, a first unclicked link contained in the first webpage, discarding a second unclicked link based on a percentage of text context, wherein the first unclicked link points to a second webpage having a text context greater than fifty percent of a whole content of the second webpage, wherein the second webpage has not been opened, and wherein the second unclicked link points to a third webpage with a text context less than fifty percent of a whole content of the third webpage;
receiving, by the processor of the user terminal, a group identification, wherein the group identification corresponds to the first unclicked link and specifies a group the first unclicked link belongs to;
determining, by the processor of the user terminal, whether there is a browsed link belonging to the group specified by the group identification; and
in response to determining there is a browsed link belonging to the group specified by the group identification, generating, by the processor of the user terminal, a prompt by changing the visual characteristics of the first unclicked link associated with the second webpage on a display associated with the user terminal to indicate that the content of the second webpage has been browsed by the user,
wherein determining whether there is browsed link belonging to the group is based in part on comparing a string code stored in a browser history of the user terminal and a string code associated with the first unclicked link,
wherein determining whether there is a browsed link in the browser history belonging to the group specified by the group identification comprises:
comparing a string code corresponding to a browsed link in the browser history with the group identification; and
determining a browsed link in the browser history corresponding to a string code that matches the group identification as belonging to the group specified by the group identification,
wherein, the string code corresponding to the browsed link in the browser history is obtained by applying the same function to the browsed link in the browser history as that for obtaining the group identification of the group according to all links classified into the group,
wherein a link associated with the first webpage, the first unclicked link associated with the second webpage, and the second unclicked link associated with the third webpage are different,
wherein the browsed link and the first unclicked link are different, and
wherein the group identification corresponds to webpages having a same or similar content.

2. The method according to claim 1, wherein the function is at least one Hash function:
the string code corresponding to the browsed link is obtained by inputting the browsed link to the at least one Hash function, so that corresponding positions in an initial string code having a first value on all of its positions provided for the browsed link in advance are set to a second value according to results output from each of the at least one Hash function; and
the group identification of the group is obtained by inputting each of all the links classified into the group to the at least one Hash function; so that corresponding positions in an initial string code having the first value on all of its positions provided for the group in advance are set to the second value according to results output from each of the at least one Hash function,
wherein, the first value and the second value are values selected from 0 and 1, and the second value differs from the first value.

3. The method according to claim 2, wherein inputting a link to the at least one Hash function comprises inputting an ASCII code or IP address of the link to the at least one Hash function.

4. The method according to claim 2, wherein comparing a string code corresponding to a browsed link with the group identification comprises:
   determining the positions set to the second value in the string code corresponding to the browsed link; and
   determining values on the determined positions of the group identification, and comparing the values with the second value,
   wherein, determining a browsed link corresponding to a string code that matches the group identification as belonging to the group specified by the group identification comprises determining that the browsed link belongs to the group specified by the group identification in response to determining that the values on the determined positions of the group identification are also set to the second value.

5. The method according to claim 1, further comprising:
   in response to a webpage being opened, storing a link of the webpage in association with a string code corresponding to the link of the web page as a browsing history record.

6. The method according to claim 5, wherein storing a link of the webpage in association with a string code corresponding to the link of the webpage as a browsing history record comprises:
   storing the link of the webpage in association with the string code corresponding to the link of the webpage and browse information for the webpage as the browsing history record; and
   wherein prompting that the content of the second webpage pointed by the link contained in the first webpage has been browsed comprises: generating a prompt indicating that the content of the second webpage, pointed to by the link contained in the first webpage, has been browsed by outputting the browse information associated with the browsed link.

7. A method for processing webpage data, comprising:
   receiving, by a processor of a network side device, a first unclicked link contained in a first webpage from a user terminal, wherein the first unclicked link points to a second webpage that has not been browsed and has a text content greater than fifty percent of a whole content of the second webpage, and the second unclicked points to a third webpage with a text context less than fifty percent of a whole content of the third webpage;
   discarding the second unclicked link based on the percentage of text context of the third webpage; and
   sending; by the processor of the network side device, a group identification of a predetermined group to the user terminal, in response to determining that the first unclicked link for the second webpage has a group identification belonging to at least one predetermined group; so that the user terminal; in response to determining that there is a browsed link belonging to a group specified by the group identification, prompts, using a display associated with the user terminal, that the content of the second webpage, pointed to by the first unclicked link contained in the first webpage, has been browsed by the use,
   wherein determining that there is browsed link belonging to the group is based in part on comparing a string code stored in a browser history of the user terminal and a string code associated with the first unclicked link,
   wherein determining whether there is a browsed link in the browser history belonging to the group specified by the group identification comprises:
   comparing a string code corresponding to a browsed link in the browser history with the group identification; and
   determining a browsed link in the browser history corresponding to a string code that matches the group identification as belonging to the group specified by the group identification,
   wherein, the string code corresponding to the browsed link in the browser history is obtained by applying the same function to the browsed link in the browser history as that for obtaining the group identification of the group according to all links classified into the group,
   wherein a link associated with the first webpage, the first unclicked link associated with the second webpage, and the second unclicked link associated with the third webpage are different, and
   wherein the group identification corresponds to webpages having a same or similar content.

8. The method according to claim 7, before sending a group identification of the predetermined group to the user terminal, further comprising the steps of:
   capturing webpage contents pointed by known links;
   classifying the known links by calculating similarity among the webpage contents, so that the links that are classified into a same group point to same or similar webpage content, wherein the at least one predetermined group is obtained by the classification; and
   generating, for each group, a group identification of the group according to all links in the group, and storing the group identification of the group in association with all the links in the group.

9. The method according to claim 8, wherein generating a group identification of the group according to all links in the group comprises:
   generating the group identification of the group by applying at least one Hash function to all the links in the group;
   wherein, the group identification of the group is obtained by inputting each of all the links classified into the group to the at least one Hash function, so that corresponding positions in an initial string code having a first value on all of its positions provided for the group in advance are set to a second value according to results output from each of the at least one Hash function; and
   the first value and the second value are values selected from 0 and 1, and the second value differs from the first value.

10. The method according to claim 7, in response to determining that the first unclicked link does not belong to any predetermined group, further comprising the steps of:
    acquiring webpage content pointed by the first unclicked link;
    classifying the first unclicked link according to similarity between the webpage content pointed by the first unclicked link and webpage contents pointed by the links in the at least one predetermined group; and
    updating the group identification of the predetermined group in response to classifying the first unclicked link to a predetermined group.

11. A system for processing webpage data, comprising a user terminal and a network side device, wherein:
    the user terminal is configured to, in response to a first webpage being opened:
    send a first unclicked link contained in the first webpage to the network side device, discard a second unclicked link based on a percentage of text context, wherein the unclicked link points to a second webpage having a text content greater than fifty percent of a whole content of the second webpage, wherein the second webpage has not been opened; and wherein the second unclicked points to a third webpage with a text context less than fifty percent of a whole content of the third webpage;

receive a group identification from the network side device, the group identification being determined by the network side device according to the first unclicked link and used to specify a group the first unclicked link belongs to;

determine whether there is a browsed link belonging to the group specified by the group identification; and in response to determining there is a browsed link belonging to the group specified by the group identification, generate a prompt by changing the visual characteristics of the first unclicked link associated with the second webpage on a display associated with the user terminal to indicate that the content of the second webpage has been browsed by the user, wherein determining whether there is browsed link belonging to the group is based in part on comparing a string code stored in a browser history of the user terminal and a string code associated with the first unclicked link, wherein determining whether there is a browsed link in the browser history belonging to the group specified by the group identification comprises:

comparing a string code corresponding to a browsed link in the browser history with the group identification; and determining a browsed link in the browser history corresponding to a string code that matches the group identification as belonging to the group specified by the group identification, wherein, the string code corresponding to the browsed link in the browser history is obtained by applying the same function to the browsed link in the browser history as that for obtaining the group identification of the group according to all links classified into the group, wherein the browsed link, the first unclicked link, and the second unclicked link are different, wherein the group identification corresponds to webpages having a same or similar content; and the network side device is configured to:

receive the first unclicked link contained in the first webpage from the user terminal; and in response to determining that the first unclicked link belongs to one predetermined group among at least one predetermined group, send the group identification of the predetermined group to the user terminal.

12. An apparatus for processing webpage data, the computer system comprising:

a display;

one or more computer processors;

one or more computer readable storage media;

program instructions stored on the one or more computer readable storage media for execution by at least one of the one or more processors, the program instructions comprising:

in response to a first webpage being opened, sending a first unclicked link contained in the first webpage to a network side device, discard a second unclicked link based on a percentage of text context, wherein the first unclicked link points to a second webpage having a text context greater than fifty percent of a whole content of the second webpage, wherein the second webpage has not been opened, and wherein the second unclicked link points to a third webpage with a text context less than fifty percent of a whole content of the third webpage;

receiving a group identification from the network side device, wherein the group identification corresponds to the first unclicked link and specifies a group the first unclicked link belongs to;

determining that there is a browsed link belonging to the group specified by the group;

generating a prompt on the display by changing the visual characteristics of the first unclicked link associated with the second webpage to indicate that the content of the second webpage has been browsed by the user, wherein determining whether there is browsed link belonging to the group is based in part on comparing a string code stored in a browser history of the user terminal and a string code associated with the first unclicked link, wherein determining whether there is a browsed link in the browser history belonging to the group specified by the group identification comprises:

comparing a string code corresponding to a browsed link in the browser history with the group identification; and determining a browsed link in the browser history corresponding to a string code that matches the group identification as belonging to the group specified by the group identification, wherein, the string code corresponding to the browsed link in the browser history is obtained by applying the same function to the browsed link in the browser history as that for obtaining the group identification of the group according to all links classified into the group, wherein a link associated with the first webpage and the first unclicked link associated with the second webpage are different, wherein the browsed link, the first unclicked link, and the second unclicked link are different, and wherein the group identification corresponds to webpages having a same or similar content.

13. The apparatus according to claim 12, wherein the function is at east one Hash function;

the string code corresponding to the browsed link is obtained by inputting the browsed link to the at least one Hash function, so that corresponding positions in an initial string code having a first value on all of its positions provided for the browsed link in advance are set to a second value according to results output from each of the at least one Hash function; and the group identification of the group is obtained by: inputting each of all the links classified into the group to the at least one Hash function, so that corresponding positions in an initial string code having the first value on all of its positions provided for the group in advance are set to the second value according to results output from each of the at least one Hash function, wherein, the first value and the second value are values selected from 0 and 1, and the second value differs from the first value.

14. The apparatus according to claim 13, wherein inputting a link to the at least one Hash function comprises inputting an ASCII code or IP address of the link to the at least one Hash function.

15. The apparatus according to claim 13, wherein the program instruction of comparing a string code corresponding to a browsed link with the group identification further comprises:

determining the positions set to t second value in the string code corresponding to the browsed link; and determining values on the determined positions of the group identification, and compare the values with the second value, wherein, determining a browsed link corresponding to a string code that matches the group identification as belonging to the group specified by the group identification comprises determining that the browsed link belongs to the group specified by the group identification in response to determining that the values on the determined positions of the group identification are also set to the second value.

16. The apparatus according to claim 15, the program instructions further comprising:

in response to a webpage being opened, storing a link of the webpage in association with a string code corresponding to the link of the web page as a browsing history record.

17. The apparatus according to claim 16, wherein the program instructions further comprise:

storing the link of the webpage in association with the string code corresponding to the link of the webpage and browse information for the webpage as the browsing history record; and generating a prompt that the content of the second webpage pointed by the link contained in the first webpage has been browsed by outputting the browse information associated with the browsed link.

18. A method for processing webpage data, the method comprising:

creating, by a processor of a network side device, a group of webpages with similar content, wherein the webpages correspond to different URIs in a browsing history of a user, and wherein the webpages have a text context greater than fifty percent of a respective content of a webpage;

receiving, by the processor of the network side device, an unvisited URI, wherein the unvisited URI is contained within a first webpage, wherein the unvisited URI points to a second webpage that is not in the browsing history, and wherein the second webpage is different than each webpage of the group of webpages with similar content; and before the second webpage has been browsed by the user: determining, by the processor of the network side device, that content of the second webpage is similar to content of the webpages in the group of webpages and, in response, sending a prompt to a client device that content related to the unvisited URI has already been browsed by the user.

19. The method of claim 18, wherein creating the group of webpages comprises determining that the webpages have similar content based on semantic similarity of the content of the webpages exceeding a predefined threshold.

20. The method of claim 18, further comprising:

receiving, from the client device, a second unvisited URI, wherein the second unvisited URI is contained within a third webpage, and wherein the second unvisited URI points to a fourth webpage; and determining that the content of the fourth webpage is not similar to content of the webpages in the group of webpages and, in response, creating a second group of webpages, wherein the second group of webpages includes the fourth webpage.

* * * * *